(12) United States Patent
Bostick et al.

(10) Patent No.: US 10,394,188 B2
(45) Date of Patent: Aug. 27, 2019

(54) PROTECTION OF PRIVATE CONTENT AND OBJECTS

(71) Applicant: International Business Machines Corporation, Armonk, NY (US)

(72) Inventors: James E. Bostick, Cedar Oarj, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 15/279,779

(22) Filed: Sep. 29, 2016

(65) Prior Publication Data
US 2018/0088527 A1   Mar. 29, 2018

(51) Int. Cl.
*H04N 7/16*  (2011.01)
*G06F 17/30*  (2006.01)
(Continued)

(52) U.S. Cl.
CPC ......... *G03H 1/0011* (2013.01); *G03H 1/2249* (2013.01); *G03H 1/2294* (2013.01);
(Continued)

(58) Field of Classification Search
CPC ...... G03H 1/0011; G03H 1/08; G03H 1/2249; G03H 2001/2252; G03H 2001/2273;
(Continued)

(56) References Cited

U.S. PATENT DOCUMENTS 6,512,607 B1 *  1/2003  Windsor ........... G02F 1/133504
                                                      313/112
8,847,919 B2 *  9/2014  Krah ................. G02B 27/2292
                                                      345/173
(Continued)

FOREIGN PATENT DOCUMENTS

EP      1 316 915 A1     6/2003
WO      WO 01/46759 A2   6/2001
WO      WO 02/48803 A1   6/2002

OTHER PUBLICATIONS

Vladimir I.; Multilevel computer-generated holograms for reconstructing 3D images in combined optical-digital security devices; SPIEDigitalLibrary ; p. 255-265 (Year: 2002).*
(Continued)

*Primary Examiner* — Monjur Rahim
(74) *Attorney, Agent, or Firm* — Scully, Scott, Murphy & Presser, P.C.; Brian Restauro, Esq.

(57) ABSTRACT

A method, system and computer program product for shielding objects from view are disclosed. In an embodiment, the method comprises detecting a specified presence around a given object; determining if the detected presence has authorization to view the given object; and when the detected presence does not have the authorization to view the given object, building a three dimensional holographic shielding image between the given object and the detected presence to shield the given object from the detected presence. In an embodiment, building the shielding image includes determining a position for the shielding image, and building the shielding image at the determined position. In an embodiment, a mobile communications device is used to build the holographic shielding image, and multiple cameras are installed in the mobile communications device to recognize placement of people in an area surrounding the given object.

17 Claims, 5 Drawing Sheets

(51) Int. Cl.
    *G06F 7/04*      (2006.01)
    *G03H 1/00*      (2006.01)
    *G03H 1/22*      (2006.01)
    *G06K 9/00*      (2006.01)
    *G09G 5/00*      (2006.01)
    *G09G 3/00*      (2006.01)
    *H04N 7/18*      (2006.01)

(52) U.S. Cl.
    CPC ..... *G06K 9/00255* (2013.01); *G06K 9/00288* (2013.01); *G06K 9/00369* (2013.01); *G09G 3/003* (2013.01); *G09G 5/00* (2013.01); *G03H 2001/2252* (2013.01); *G03H 2001/2273* (2013.01); *G03H 2210/30* (2013.01); *G03H 2226/05* (2013.01); *G09G 2358/00* (2013.01); *H04N 7/181* (2013.01)

(58) Field of Classification Search
    CPC ........... G03H 2210/30; G06K 9/00255; G06K 9/00288; G06K 9/00369; H04N 7/181
    USPC .......................................................... 726/28
    See application file for complete search history.

(56) References Cited

U.S. PATENT DOCUMENTS

| | | | | |
|---|---|---|---|---|
| 2002/0096985 | A1* | 7/2002 | Hazzard | G02B 5/32 313/112 |
| 2004/0145540 | A1* | 7/2004 | Amanai | G02B 5/0252 345/8 |
| 2009/0141895 | A1* | 6/2009 | Anderson | G06F 21/84 380/252 |
| 2011/0153362 | A1* | 6/2011 | Valin | G06Q 20/105 705/3 |
| 2011/0261427 | A1* | 10/2011 | Hart | G03H 1/2249 359/22 |
| 2011/0321143 | A1* | 12/2011 | Angaluri | H04N 9/3194 726/6 |
| 2013/0301090 | A1* | 11/2013 | Flynn | G03H 1/20 359/2 |
| 2014/0063191 | A1* | 3/2014 | Bataller | G07C 9/00158 348/46 |
| 2015/0163206 | A1* | 6/2015 | McCarthy | G06F 21/6227 713/171 |
| 2015/0220058 | A1* | 8/2015 | Mukhtarov | G02B 5/32 359/15 |
| 2015/0371613 | A1* | 12/2015 | Patel | G06F 21/10 345/549 |

OTHER PUBLICATIONS

Anonymous, "Method and System for Evaluating Confidentiality of Content to be Displayed on Different Areas of Transparent Flexible Display Devices", IP.com Prior Art Database Technical Disclosure, IP.com No. APCOM000239673D, Nov. 24, 2014, pp. 1-5.

Basal et al., "3D reconstruction and characterization of laser induced craters by in situ optical microscopy", Appl. Surf. Sci. (2016), http://dx.doi.org/10.1016/j.apsusc.2015.11.249; Article received Jun. 23, 2015; received revised form Nov. 4, 2015; Accepted Nov. 29, 2015., 7 pages.

Matsushima et al., "Computer holography: 3D imaging of virtual and real objects", International Workshop on Holography and related technologies, pp. 1-2 (Nov. 16, 2011).

Russon, "Touchable 3D holograms in daylight now possible using superfast lasers", http://www.ibtimes.co.us/touchable-3d-holograms-daylight-now-possible-using-superfast-femtosecond-lasers-1508599, Jun. 30, 2015.

"Holograms are finally here: Plasma lasers used to create images in mid-air", http://www.pocket-lint.com/news/131622-holograms-are-finally-here-plasma-lasers-used-to-create-images-in-mid-air, last printed Mar. 17, 2016.

Etherington, "Apple Patents a 3D Hologram Display System With Gesture Input", TechCrunch, http://techcrunch.com/2014/04/24/apple-patents-a-3d-hologram-display-system-with-gesture-input, posted Apr. 24, 2014.

Lin et al., "Hiding a Covert Digital Image by Assembling the RSA Encryption Method and the Binary Encoding Method", Hindawl Publishing Corporation, Mathematical Problems in Engineering, vol. 2014, Article ID 603659, 8 pages; received Sep. 16, 2013; Accepted Nov. 29, 2013; Published Mar. 13, 2014.

Rossignol, "Apple granted patent for interactive holographic display device", http://www.iphonehacks.com/2014/09/apple-patent-interactive-holographic-display-device-html; posted Sep. 30, 2014.

"Star Wars-inspired prototype creates holographic display", http://www.reuters.com/article/us-telecoms-mwc-mobile-holograms-idUSKBN0M11QZ20150305#QsrsyT7Pp7xS7XSL.07, Mar. 5, 2015.

Cervantes, "Samsung tiles patent for smartphone that can display holographic images", http://www.androidauthority.com/samsung-patent-smartphone-that-can-display-holographic-images, Aug. 11, 2015.

Ochiai et al., "Fairy Lights in Femtoseconds: Aerial and Volumetric Graphics Rendered by Focused Femtosecond Laser Combined with Computational Holographic Fields", ACM Transactions on Graphics, vol. 35, No. 2, Article 17, Feb. 2016.

* cited by examiner

PROTECTION OF PRIVATE CONTENT AND OBJECTS

BACKGROUND

This invention generally relates to protecting the privacy of content and objects that are generated for viewing, such as images and documents. Embodiments of the invention are well suited for protecting the privacy of such objects that are generated by mobile devices.

Often, users look at confidential content within an electronic file while in a public place or a place where there are other users who are not authorized to see the confidential content. Once a user opens a document with confidential content in a public area, there is a risk that other unauthorized users can see the confidential content.

In particular, mobile computing devices, such as mobile phones are being used with increasing frequency to view all types of content, including confidential content. Due in part to the mobile nature of these devices, they are often used in public places, or in many other places where the user of the device may not want content that is shown on the device to be seen by others in the area.

Recently, mobile devices such as smart phones have been developed that are able to produce holographic displays. The number of games, apps and users is continually growing that are taking advantage of 3D holographic imaging. With the growing use of mobile devices to produce holographic displays, there is a need to protect private or secure imaging from being visible to unauthorized or inappropriate persons.

SUMMARY

Embodiments of the invention provide a method, system and computer program product for shielding a given object from view. In an embodiment, the method comprises detecting a specified presence around a given object; determining if the detected presence has authorization to view the given object; and when the detected presence does not have the authorization to view the given object, building a three dimensional holographic image between the given object and the detected presence to shield the given object from the detected presence.

In an embodiment, the system comprises a mobile communications device including an imaging module for detecting a specified presence around a given object, a processing given holographic object, and a holographic display module for building a three dimensional holographic shielding image between the given object and the detected presence to shield the given object from the detected presence when the detected presence does not have the authorization to view the holographic object.

DETAILED DESCRIPTION

As mentioned above, mobile devices have been developed that are able to produce holographic displays, and the number of games, apps and users is continually growing that are taking advantage of 3D holographic imaging by mobile devices.

As mobile devices are often used in public places, the increasing use of such devices to produce holographic images raises privacy and security concerns. In particular, there is a need to protect private or secure imaging from being visible to unauthorized or inappropriate persons.

Embodiments of the invention address his issue. Embodiments of the invention build a blocking 3D image in between these secure objects and the people who are not supposed to see them, and this is done dynamically based on the discovered positioning of people as well as known security properties of any object. Embodiments of the invention may protect more than images, or three-dimensional holographic objects, and may protect the opening of documents and other items. Embodiments of the invention protect with three-dimensional wall images, and these could protect a wide range of objects, events, and items, whether an image, watching a movie, or editing a document, and others.

Embodiments of the invention evaluate the confidentiality or sensitivity levels of various objects. In order to hide the displayed images, embodiments of the invention create a holographic wall in the case where there is a possible intrusion from one side or the other, as detected by sensors and cameras. The wall is purposed to hide the content on the other side of the wall, which only the user of the mobile device will see. Multiple surrounding walls can be built if deemed necessary by the system.

Embodiments of the invention also detect cases where one or multiple walls would not do much good because there are just too many people around. This might be the case, for instance, in the middle of a crowded subway.

Figure 1:
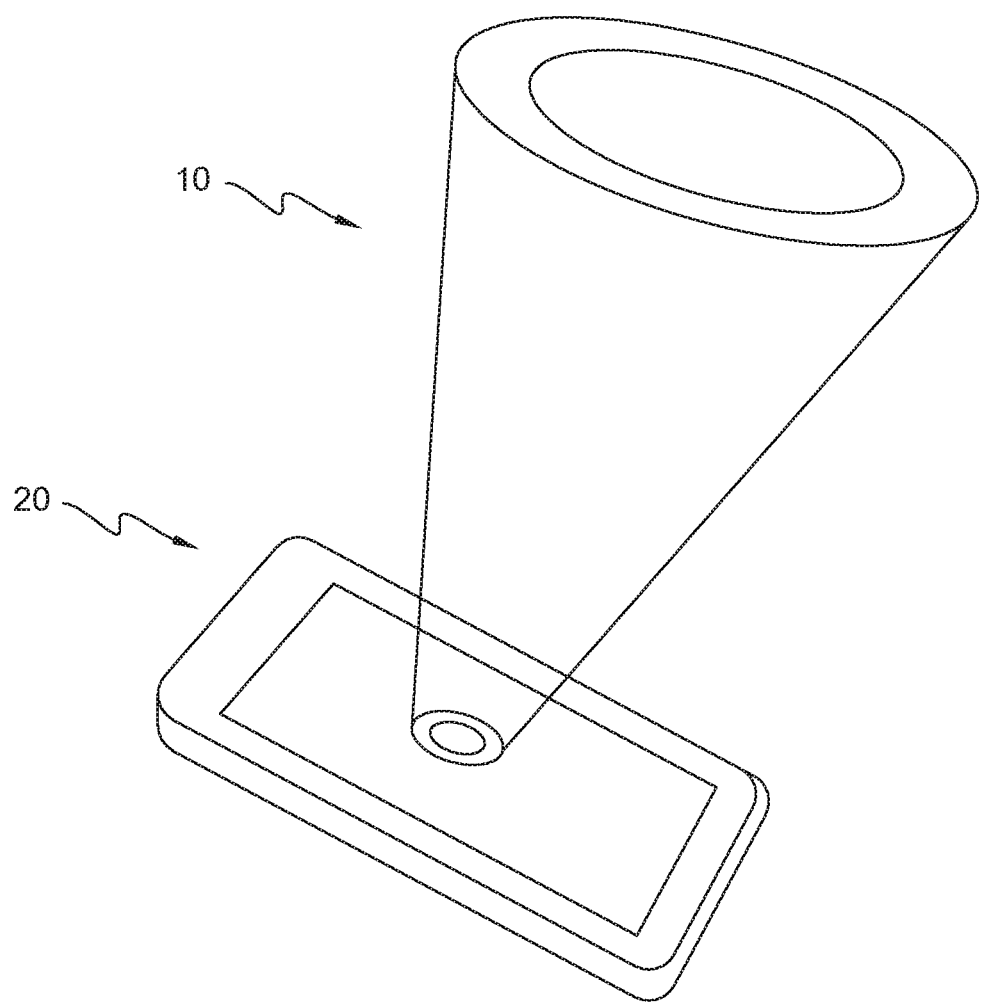
FIG. 1 shows a holographic image produced by a mobile communications device.

As is known in the art, 3D holographic objects can be created in air. This makes the objects visible from any surrounding persons. FIG. 1 shows a holographic object 10 created in space by a mobile communications device 12.

3D holographic objects can be displayed and even manipulated in space. Embodiments of the invention add a new level of protection for the security of these objects.

Embodiments of the invention detect potential intrusions through the use of cameras and sensors to understand if others are around and could see the holographic display. Based on any possible intrusion of privacy, and only for holographic objects deemed private or marked with a higher security level, a holographic wall is created such that the wrong people cannot view the secure holographic object. The wall is purposed to hide the content on the other side of the wall, which only the intended user is able to see. Multiple surrounding walls can be built if deemed necessary by the system in accordance with embodiments of the invention. The system also detects cases where one or multiple walls would not do much good because there are just too many people around, such as might be the case in the middle of a crowded subway or an area where people are moving around quickly. In this case, the user is warned.

Using the technology to build holographic images, embodiments of the invention build a holographic wall to protect from people looking at content on a phone, even if that content is not holographic. In this way, if a confidential message is received, a holographic wall can be assembled so only the intended user can see the screen of the phone.

In one embodiment, as a configurable option for less intrusive situations, instead of building a wall around the object, a user may resize or dim an object as appropriate.

Embodiments of the invention dynamically build a holographic wall or obstacle in between people and the secure objects that they are not supposed to see, based on the systems' capability to understand the relative positioning between people and objects, and then using holographic capabilities to build a wall as an obstacle between said people and the private object. Additionally, embodiments of the invention may employ lesser security measures, such as dimming or resizing a 3D object in cases where that object might be slightly private.

In addition, in embodiments of the invention, the cameras and image processing system can be trained on a granular level that certain private or secure objects may be viewed by a specific individual, who can be identified through typical image analysis.

An important advantage to the user is the ability to be able to use 3D holographic displays and not have to worry about privacy or security concerns which are handled automatically through the system.

Figure 2:
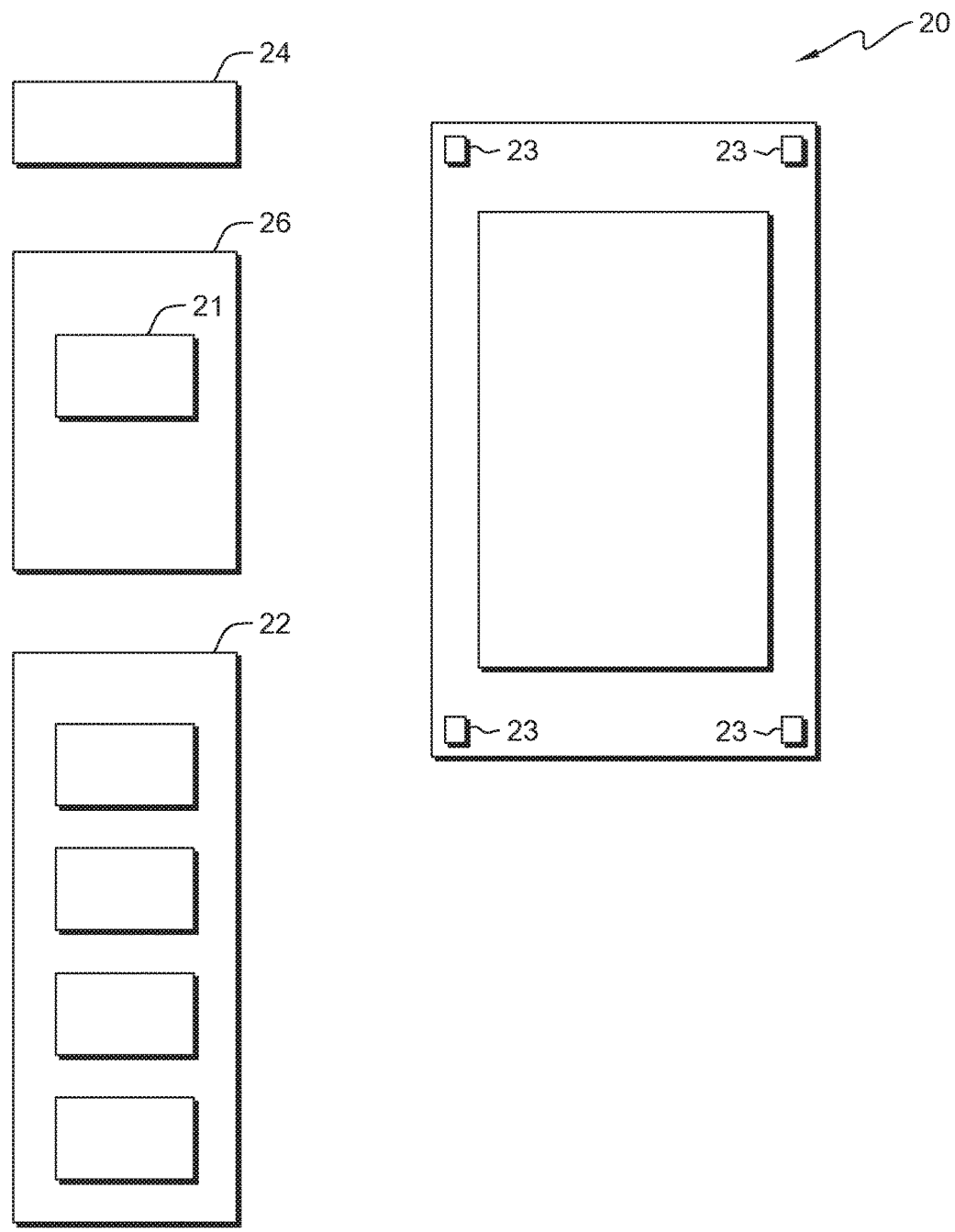
FIG. 2 is a schematic drawing of a mobile communications device that may be used in embodiments of the invention.

FIG. 2 illustrates a mobile communications device 20 in accordance with an embodiment of the invention. Generally, device 20 comprises cameras 23, image analysis 22, software 21, and holographic display capability 24. FIG. 2 also shows a processor unit 26 that may be included in or used with the mobile device 20.

Any suitable mobile device may be used in this invention, and this includes multiple current mobile devices already existing and to be developed in the future.

A wide variety of communication or computing devices, of various sizes and types, and both mobile and stationary, may be used in embodiments of the invention. For example, mobile devices that may be used in embodiments of the invention may include portable phones, such as cell phones or the like, a smart phone, a Session Initiation Protocol (SIP) phone, a video phone, a portable email device, a thin client, or a portable gaming device. Mobile communication devices may also be, as additional examples, tablet computers and single-purpose mobile devices (such as eBooks). Other communication devices that may be used in embodiments of the invention include, as examples, personal computers, workstations, and laptop computers.

Embodiments of the invention may be applicable on a tablet or larger smart phone. The tablets have a larger space for viewing a larger area, and thus larger sized holograms could be created.

The mobile devices are equipped with known capabilities to show objects and images holographically.

In embodiments of the invention, micro-cameras 23 are installed in all corners or sides of the device 20 so as to provide full coverage in determining the location of other people who might be able to see the private or secure objects.

Image analysis 22 provides the capability to determine from images whether an image is a person, and the capability to understand where that person's face and eyes are. Image analysis 24 is used to determine the location of the people in relation to the private or secure objects.

Holographic display capability 24 is used to generate one or more holographic images. For example, display capability may be used to generate an object of interest, and one or more additional holographic objects that act to block, or interfere with, the view of the holographic object of interest from unauthorized or inappropriate people. Holographic display capability may, for example, comprise a plurality of or a multitude of individual hologram display apparatuses 24a, 24b, 24c and 24d, each of which is used to generate a separate hologram display.

Known procedures may be used to build the holographic display. Embodiments of the invention add the capability of determining when to project a wall or blocker and where to project it. Any known or suitable hologram projection capability may be used to project the hologram. Embodiments of the invention use those capabilities, and project additional holographic images as the system determines that these additional images are necessary. Embodiments of this invention add more projection capability that enables more holograms to be built, including the walls that are built when the system deems it necessary.

Any suitable processing unit may be used in embodiments of the invention. The processing unit 26 may include a central processor unit (CPU) for processing information and performing other computational and control tasks, and a volatile storage, such as a random access memory (RAM) or other dynamic storage device for storing various information as well as instructions to be executed by the CPU. The volatile storage also may be used for storing temporary variables or other intermediate information during execution of instructions by the CPU. The processing unit may further include a read only memory (ROM or EPROM) or other static storage device for storing static information and instructions for the CPU, such as basic input-output system (BIOS), as well as various system configuration parameters.

Figure 3:
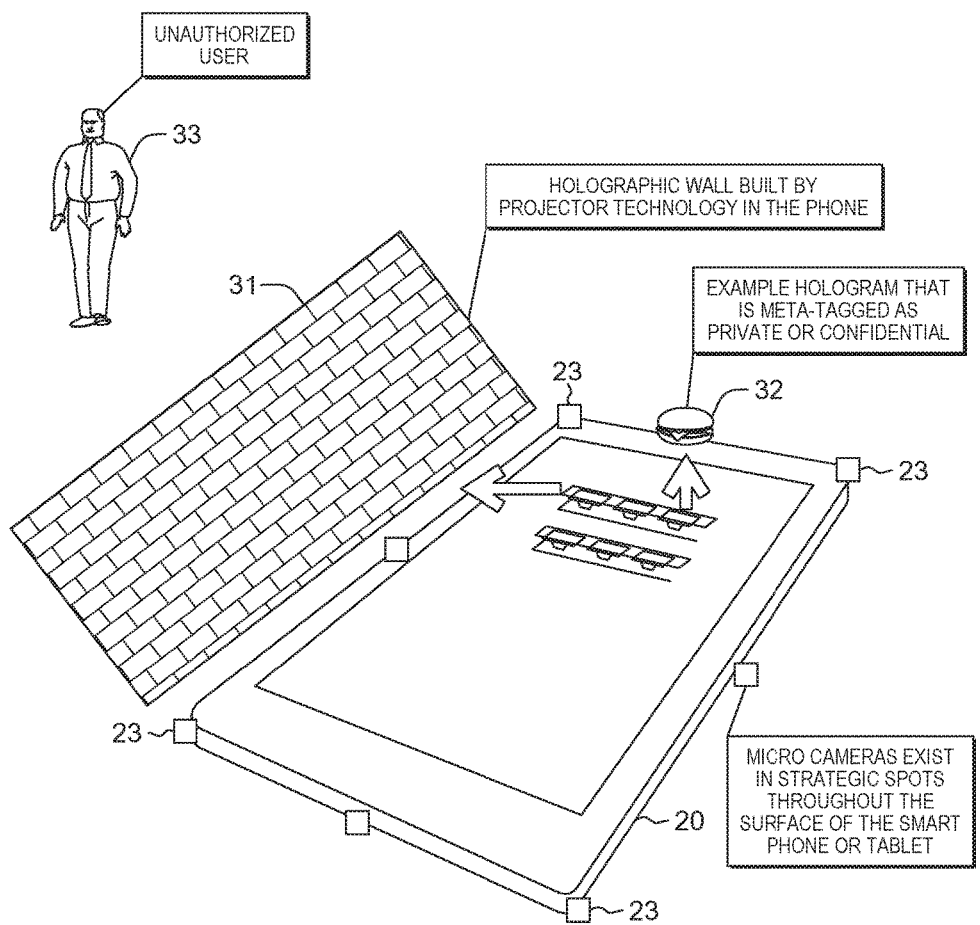
FIG. 3 shows a holographic display and a blocking holographic wall produced in an embodiment of the invention.

FIG. 3 shows an example of a holographic wall 31, which is automatically, dynamically built and placed in between the private or secure object 32 and the unauthorized person, represented at 33. The dynamic aspect is important because people and devices move around. People come and people go. As a person changes position, the positioning of the wall 31 is updated. As a new person comes, a new wall is built. The process is constantly updated to ensure that users are always protected from unauthorized viewing.

The holographic wall is built by projector technology in the phone, the same as other holograms. In this case, for example, the wall is built because the micro cameras 23 use image analysis 22 and facial analysis to determine that a person is within viewing distance on that side, and that person is not a known person.

Object 32 is an example hologram that is meta-tagged as private or confidential to the user. The user does not want to share this hologram with unauthorized users.

Micro cameras 23 are positioned in strategic spots throughout the surface of the smart phone 20 or tablet in order to see the position of people, and in particular unauthorized users. Optimal placement may be determined during testing phases, and the particular placement shown in the drawings is only an example.

Figure 4:
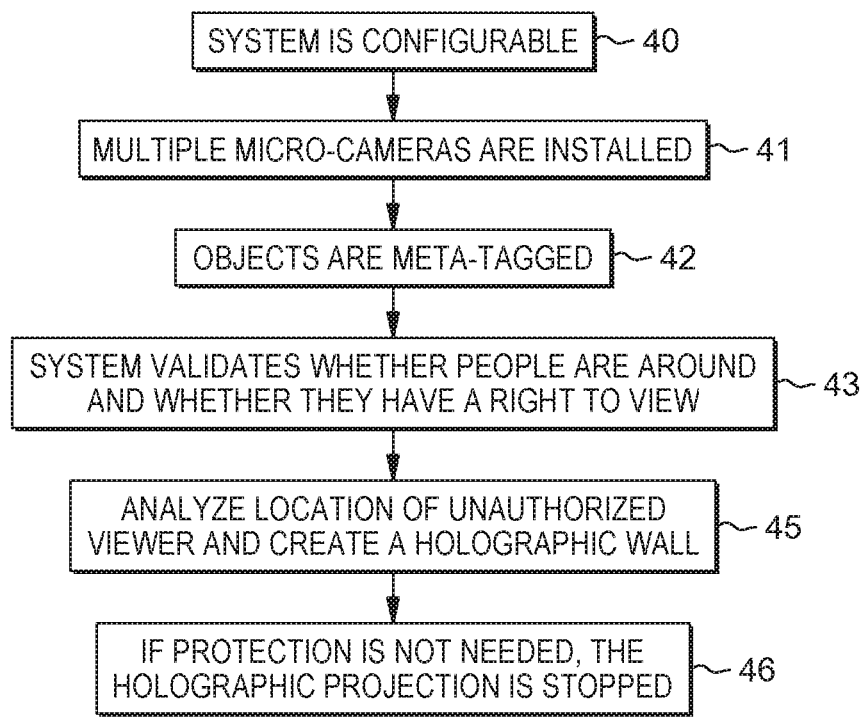
FIG. 4 illustrates aspects of an embodiment of this invention.

FIG. 4 illustrates aspects of an embodiment of the invention. As represented at 40, systems of embodiments of the invention are configurable. The capability described herein can be turned on and off. In addition, there may be options in certain embodiments to resize private objects to a smaller size in order to make them less viewable by those around, and as opposed to building a wall around an object. There may be an option to dim the object so that it is less viewable. These types of configurable options are available for users to work with and to learn their own preferences.

As represented at 41, the mobile device 20 has multiple micro-cameras 23 installed in different sides in order to recognize the placement of people in the surrounding area. This may be done through image analysis.

As indicated at 42, all the holographic objects are meta-tagged as being private or secure. In embodiments of the invention, if so configured, the user may decide to manually build a holographic wall around his entire screen or display area, whether the objects are tagged as private/secure, or not.

As represented at 43, the system validates whether or not people are around, and validates if those people have the appropriate right to view the object or not. In an embodiment, the image processing capability could be trained to the fact that certain faces recognized by the image analysis are people that are allowed to look at private and secure objects with the main user. So, for example, the system could be trained as to the face of a user's wife being allowed to see the 3D holographic images of their children.

As represented at 45, based on camera feed analysis combined with the relative positioning of the private or secured object, software analyzes the location of the unauthorized viewer and accordingly creates a holographic wall directly in between that person's eyes and the object in question. The created wall is large enough to block out the vision of the person. Multiple walls may be built if the system determines that there are multiple people. The walls dynamically place themselves as people move around or as the relative coordinates of the object and the unauthorized peoples' eyes change.

If the system determines by the numbers of people that one solid surrounding wall (for example, of the shape of an amphitheatre) should be built instead of multiple discontinuous walls, then the single amphitheatre shaped surrounding wall is created. The user may manually create the single surrounding wall if he or she wants to. If a wall is automatically created, the user can turn that wall off. In this case, the user is deciding to share an object.

As represented at 46, if the software determines that the protection from unauthorized viewer is not needed, then the software automatically stops the holographic projection.

Figure 5:
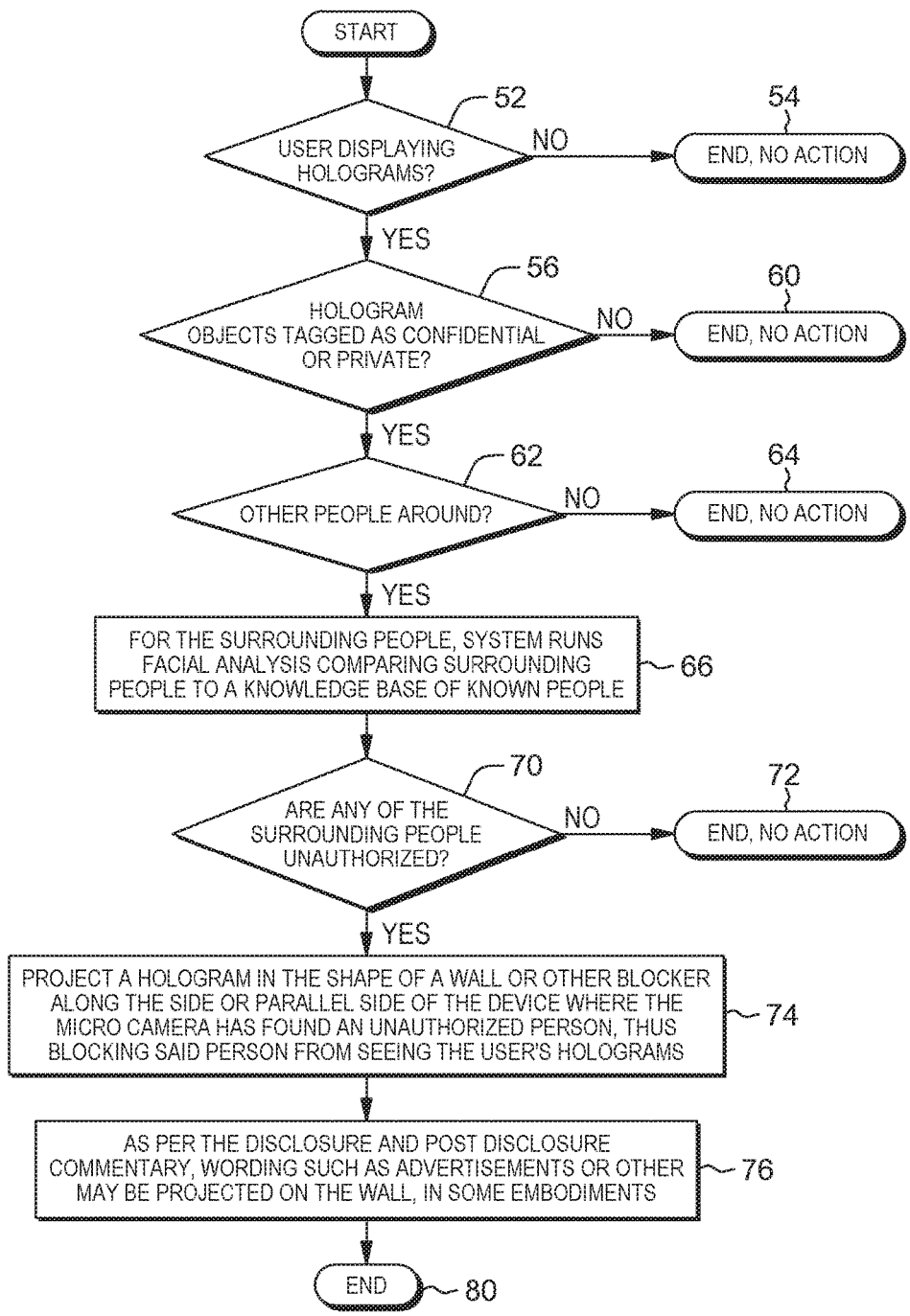
FIG. 5 shows an implementation of an embodiment of this invention.

FIG. 5 shows an implementation of an embodiment of this invention. At 52, the system determines whether the user is displaying a hologram. If no hologram is being displayed, the process ends at 54. If a hologram is being displayed, then at 56, the system determines whether the hologram is tagged as confidential or privileged. If the object is not tagged as confidential or privileged, the process ends at 60.

If the object is tagged as confidential or privileged, the process moves to 62 and determines whether other people are around. If there are no other people around, the process ends at 64. If there are other people around, the system, at 66, runs facial analysis to attempt to identify these people.

If any of the cameras detects or determines that there is a person in the direction the camera is pointing, that fact is made known by the system. Each micro camera is associated to a known id by the overall system, so that the system knows which camera is seeing the person or people.

Image processing is used to determine that they are faces of a human. Facial recognition software is an art that can determine who the person is, if known by the system. Faces seen by the camera can be compared to a database of known faces by the system, which grows over time. For example, the system could be taught that person A is the user's wife. Person A would have a picture in the knowledge base to compare against. Person A would also have authority meta data tagged to her in the knowledge base so that the system understands that she can see confidential and private information.

Also, when other people are present, the system, at 70, determines if any of the surrounding people are unauthorized. A known face can be compared to the database to determine whether the person is authorized or not authorized. Unknown faces are strangers and would default to not being able to see confidential or private information. If there are no unauthorized people around, the process ends at 72.

If unauthorized people are around, then, at 74, a blocking or interfering holographic object is generated. Based on camera feed analysis combined with the relative positioning of the private or secured object, software analyzes the location of the unauthorized viewer and accordingly creates a holographic wall directly in between said person's eyes and the object in question. Image data received from the micro cameras that surround the tablet or phone, as shown in the Figure, and the system understands the directions those cameras are pointing.

The system thus knows which cameras can see person(s), and more specifically, the system knows which cameras can see unauthorized person(s). Those specific cameras are pointing a certain direction, and therefore the wall needs to block in that direction, and projection software creates a holographic wall as needed. The created wall is large enough to block out the vision of the person. Multiple walls may be built if the system determines that there are multiple people. So, if multiple cameras notice multiple persons, the wall building capability and positions associated to those cameras are built.

In embodiments of the invention, the walls dynamically place themselves as people move around or the relative coordinates of the object and the unauthorized people's eyes change. When the position of the mobile device is changed, the process starts again in determining the relative positions of the users.

If the system determines by the numbers of people that one solid surrounding wall (such as a wall having the shape of an amphitheater) should be built instead of multiple discontinuous walls, then the single amphitheater shaped surrounding wall is created. This may be the case, for example, where all cameras are noticing people, people are all around, and there are walls surrounding the entire device, except for the direction facing the user and owner of the device.

The user may manually create a single surrounding wall if he wants to. This may be done in case the system does not behave the way the user wants, or in case the user does not want even normally authorized users to see what he is doing. Likewise, if a wall is automatically created, the user can turn that wall off. In this case, the user is deciding to share an object.

Also, as represented at 76, in embodiments of the invention, commentary or wording such as advertisements or other information, may be projected on the holographic wall. The process may then end at 80.

Using the technology to build holographic images, embodiments of the invention may be used to build a holographic wall to protect from people looking at content on a user's phone, even if that content is not holographic. So, if a confidential message is received, a holographic wall could be assembled so only the intended user can see the screen of the phone.

In one embodiment, as a configurable option for less intrusive situations, instead of building a wall around the object, embodiments of the invention may resize or dim an object as appropriate.

Embodiments of the invention provide a number of significant advantages. For instance, embodiments of the invention allow a user to operate all of his or her apps and videos holographically as if nobody is around, while still blocking others around from seeing the holographic images. With embodiments of the invention, if applications have a small or low level of privacy to a user, those holographic images are dimmed to those around. On the other hand, if those objects are tagged with high confidentiality, they will not be seen at all due to a blocking wall automatically projected in between any and all users and the object in question.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of generating a holographic image for shielding objects from view, comprising:
   detecting a specified presence around a given object;
   determining if the detected presence has authorization to view the given object;
   and determining when and where to build a three-dimensional holographic shielding image between the given object and the detected presence to shield the given object from the detected presence, including when the detected presence does not have the authorization to view the given object, a holographic display apparatus building the three dimensional holographic shielding image between the given object and the detected presence to shield the given object from the detected presence, including
      determining a position of the detected presence, using the determined position of the detected presence for determining a position for the holographic shielding image, and the holographic display apparatus building the holographic shielding image at the determined position for the holographic shielding image; and wherein:
   the specified presence moves relative to the given object; and
   the building a three-dimensional holographic image includes dynamically adjusting positions of the three-dimensional holographic image as the specified presence moves relative to the given object to keep the three-dimensional holographic image between the specified presence and the given object.

2. The method according to claim 1, wherein the determining a position for the holographic shielding image includes:
   determining a position of the given object; and
   using the determined position of the given object and the determined position of the detected presence in a process for determining the position of the holographic shielding image.

3. The method according to claim 1, wherein:
   a specified mobile communications device is used to build the three dimensional holographic shielding image; and
   the detecting a specified presence around a given object includes using multiple cameras installed in the mobile communications device to recognize placement of people in an area surrounding the given object.

4. The method according to claim 1, wherein the determining if the detected presence has authorization to view the given object includes:
   obtaining image data of a defined area relative to the given object; and
   analyzing the image data to determine if any one of a pre-specified group of images is present in the defined area.

5. The method according to claim 4, wherein:
   the analyzing the image data includes analyzing the image data to determine if any persons are in the defined area; and
   the determining if the detected presence has authorization to view the given object further includes when any persons are determined to be in the defined area, identifying a security level for each of said any persons in the defined area.

6. The method according to claim 1, wherein the building a three dimensional holographic image includes generating a plurality of shielding holographic images at different positions at different times to shield the given object from the detected specified presence.

7. The method according to claim 6, wherein:
   the generating the plurality of shielding holographic images includes generating the plurality of the shielding holographic images at the different positions at the different times, to keep the given object shielded from the detected specified presence as the detected specified presence moves relative to the given object.

8. The method according to claim 1, wherein the building a three dimensional holographic image includes:
   identifying a level of security for the given object; and
   shielding the given object in a predetermined manner based on the level of security identified for the given object.

9. The method according to claim 1, wherein the given object is a three dimensional holographic object.

10. A system for generating a holographic image for shielding objects from view, comprising:
    a mobile communications device including:
       an imaging module for detecting a specified presence around a given object, a processing module for determining if the detected presence has authorization to view the given object and for determining when and where to build a three-dimensional holographic shielding image between the given object and the detected presence to shield the given object from the detected presence, and a holographic display module for building the three dimensional holographic shielding image between the given object and the detected presence to shield the given object from the detected presence when the detected presence does not have the authorization to view the given object; and wherein:
    the processing module includes a sub-module for determining a position of the detected presence, and using the determined position of the detected presence for determining a position for the holographic shielding image;
    the building a three dimensional holographic shielding image include building the holographic shielding image at the determined position of the holographic shielding image; the specified presence moves relative to the given object; and the building a three-dimensional holographic image includes dynamically adjusting positions of the three-dimensional holographic image as the specified presence moves relative to the given object to keep the three-dimensional holographic image between the specified presence and the given object.

11. The system according to claim 10, wherein:
the imaging module obtains image data of a defined area relative to the given object; and
the processing module includes an image analysis sub-module for analyzing the image data to determine if any one of a pre-specified group of images is present in the defined area.

12. The system according to claim 10, wherein the imaging module includes multiple cameras to recognize placement of people in an area surrounding the given object.

13. The system according to claim 10, wherein the given object is a three dimensional holographic object.

14. A computer program product for generating a holographic image for shielding objects, the computer program product comprising a computer readable storage medium having program instructions embodied therein, the program instructions executable by a computer to cause the computer to:
detect a specified presence around a given object;
determine if the detected presence has authorization to view the given object;
and determine when and where to build a three-dimensional holographic shielding image between the given object and the detected presence to shield the given object from the detected presence, including when the detected presence does not have the authorization to view the given object, operate a holographic display module to build the three dimensional holographic shielding image between the given object and the detected presence to shield the given object from the detected presence, including
determining a position of the detected presence, using the determined position of the detected presence for determining a position for the holographic shielding image, and building the holographic shielding image at the determined position for the holographic shielding image; and wherein:
the specified presence moves relative to the given object; and
the building a three-dimensional holographic image includes dynamically adjusting positions of the three-dimensional holographic image as the specified presence moves relative to the given object to keep the three-dimensional holographic image between the specified presence and the given object.

15. The computer program product according to claim 14, wherein the program instructions are executable by the computer to cause the computer to:
obtain image data of a defined area relative to the given object; and
analyze the image data to determine if any one of a pre-specified group of images is present in the defined area.

16. The computer program product according to claim 15, wherein the program product instructions are executable by the computer to cause the computer to: analyze the image data to determine if any persons are in the defined area; and
when any persons are determined to be in the defined area, identify a security level for each of said any persons in the defined area.

17. The computer program product according to claim 14, wherein the given object is a three dimensional holographic object.

* * * * *